Feb. 7, 1967 E. S. SCHLIG 3,303,478

INFORMATION COUPLING ARRANGEMENT FOR CRYOGENIC SYSTEMS

Filed July 1, 1963 2 Sheets-Sheet 1

INVENTOR.
EUGENE S. SCHLIG

BY

S. P. Tedesco

ATTORNEY

FIG. 3
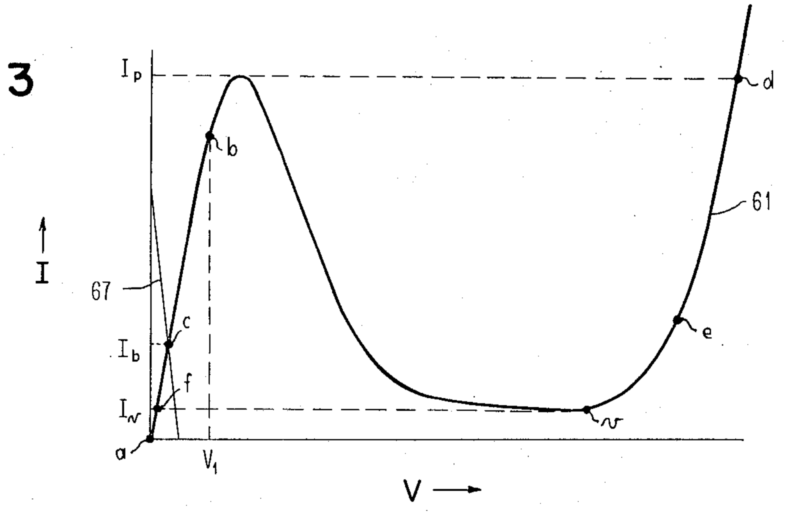
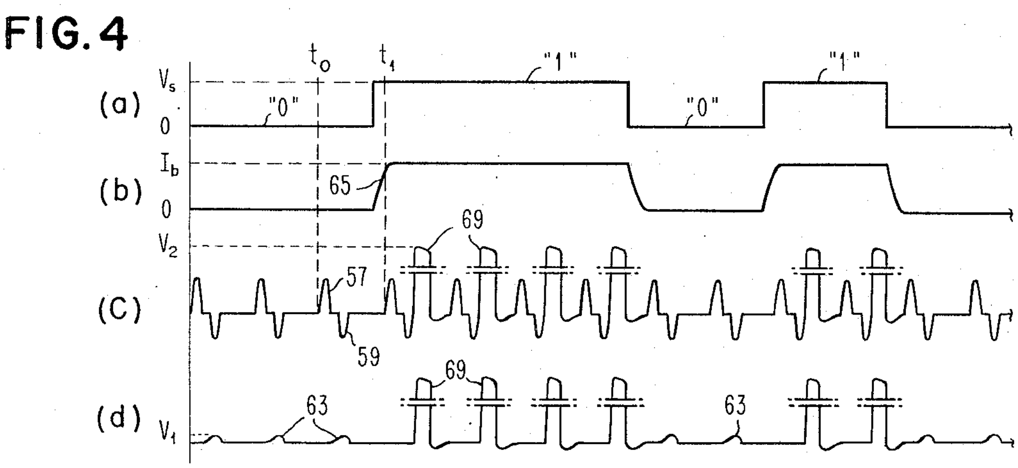
FIG. 5
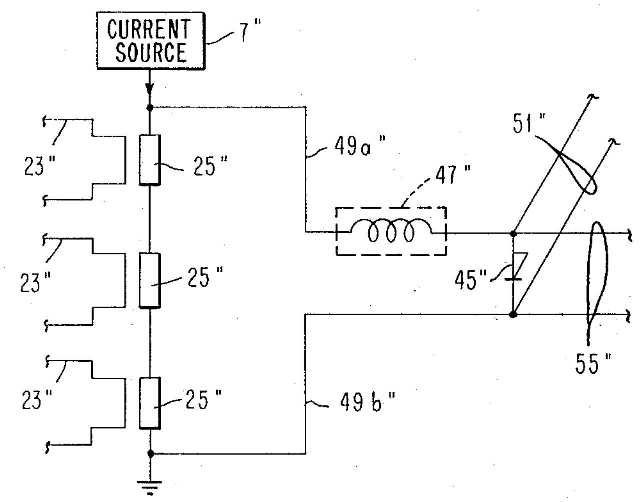

3,303,478

INFORMATION COUPLING ARRANGEMENT FOR CRYOGENIC SYSTEMS

Eugene S. Schlig, Croton Falls, N.Y., assignor to International Business Machines Corporation, New York, N.Y., a corporation of New York Filed July 1, 1963, Ser. No. 292,043
7 Claims. (Cl. 340—173.1)

This invention relates to cryogenic systems and, more particularly, to circuit arrangements utilizing nonlinear devices for performing readout and intersubstrate coupling functions in cryogenic systems.

The feasibility of cryogenic devices as circuit elements in high-speed logic and memory applications has been demonstrated. Cryogenic devices are particularly attractive for such applications due to their very fast switching speeds, in the order of nanoseconds, and, also, extremely low power requirements. The operation of cryogenic devices is based on the physical phenomenon of superconductivity which can be defined as that property of certain materials to exhibit no electrical resistance when maintained below a critical transition temperature $T_c$ characteristic of the particular material; critical transition temperatures of known superconductive materials range between 0.1° Kelvin and 17° Kelvin. At the critical transition temperature $T_c$, and neglecting slight hysteretic effects, the transition of a specimen between a superconductive or resistanceless state and a normal resistance state is very nearly discontinuous. When maintained below the critical transition temperature $T_c$, superconductivity along such specimen can be destroyed by magnetic fields, generated either externally or internally, in excess of a critical magnitude $H_c$.

Cryogenic systems are artificially refrigerated at near 0° Kelvin by immersion in a cryogenic medium, for example, a liquid helium bath contained in a cryostat arrangement. Accordingly, communication must be provided along input and output lines between the cryogenic system and auxiliary equipments disposed external to the cryogenic medium, e.g. working current sources, sense amplifiers, ground connections, etc. A cryogenic system immersed in a cryogenic medium and also certain auxiliary equipments connected thereto along input and output lines is shown, for example, in the J. L. Anderson et al. patent application Serial No. 248,122, filed on December 28, 1962 and assigned to a common assignee. The input and output lines are often thin film transmission lines of superconductive material which pass into and are connected to the cryogenic system within the cryogenic medium.

Generally, information signals are developed within a cryogenic system by means of sense cryotrons, the state of the sense gate conductors, i.e. superconductive or resistive, being indicative of binary "0" or binary "1," respectively. Information signals thus developed are D.C. level-type signals, binary "0" and binary "1," indicated by zero voltage and very low voltage signals, respectively. The problem of readout and also intersubstrate coupling, therefore, is necessarily complicated. For example, intersubstrate coupling functions are generally conducted on a current-switching basis whereby inductance of the coupling channel is a speed limiting factor. Readout functions are conducted on a voltage basis and, therefore, can be effected at somewhat faster speeds; as the level-type information signals may persist indefinitely, the readout channel is necessarily D.C. coupled and requires high gain. The speeds at which the readout and coupling functions are effected and, also, the signal-to-noise ratio would be materially increased if the binary "1" information signals are amplified within the cryogenic medium and prior to being directed along the interconnecting transmission line.

Amplification of information signals with the cryogenic medium has not been considered practical heretofore because of heat generation within the cryogenic medium. Cryogenic systems are extremely temperature sensitive and variations in operating temperature in the order of $10^{-3}$° Kelvin would have a pronounced effect on their operating characteristics. Further, devices for effecting amplification to be compatible with cryogenic systems must be operable at cryogenic temperatures, at speeds comparable with those of cryogenic devices and, also, have low power dissipation.

One object of this invention, therefore, is to provide an amplifier arrangement compatible with cryogenic systems and having low power dissipation.

Another object of this invention is to provide an amplifier arrangement for effecting readout and intersubstrate coupling functions in a cryogenic system which exhibit no power dissipation in a quiescent state.

Another object of this invention is to provide an amplifier arrangement compatible with cryogenic systems and operative to convert low voltage D.C. information signals to relatively large amplitude, short duration pulses.

These and other objects and advantages of this invention are achieved by coupling a nonlinear device operative at cryogenic temperatures, e.g. tunnel diode, injection laser, etc., in parallel arrangement with the information signal source, e.g. sense gate conductor. The tunnel diode, therefore, is biased by the information signal developed across the sense gate conductor to which is to be coupled. While the sense gate conductor is superconductive, i.e. binary "0," the tunnel diode is unbiased and no power is dissipated in the cryogenic medium. While the sense gate conductor is resistive, i.e. binary "1," the tunnel diode is biased along the low voltage portion of the n-shaped characteristic current-voltage curve. Power dissipation of the tunnel diode at this time is appreciably small compared to that dissipated by a normal gate conductor whereby heat loss introduced into the cryogenic medium is minimal.

The tunnel diode is coupled along a thin film transmission line, for example, to a sense amplifier disposed exterior to the cryostat arrangement or, if intersubstrate coupling is to be effected, to the cryogenic arrangement to which information is to be transferred. To effect the coupling function, a drive pulse of fast rise time and having a duration short compared to the inductive time constant of the sense gate conductor is coupled across the tunnel diode along a second thin film transmission line. Accordingly, the drive pulse is applied almost entirely across the tunnel diode. The drive pulse is of sufficient magnitude to switch the tunnel diode to a high voltage state only when biased by the sense gate conductor in a resistive state, i.e. binary "1." By adapting the tunnel diode for monostable operation, the level-type binary "1" signal, in the order of tens of millivolts, is converted to a short duration pulse of several hundred millivolts which is applied along the information transfer channel. While the sense gate conductor is superconductive, the drive pulse is effective only to shuttle the tunnel diode along the low voltage portion of its characteristic curve whereby power dissipation is minimal and only small shuttle noise is produced along the coupling channel.

Tunnel diodes exhibit switching speeds in the order of one nanosecond (one nanosecond=$10^{-9}$ seconds) and, therefore, are compatible with cryogenic systems. The fast switching speeds exhibited by tunnel diodes is primarily due to a quantum-mechanical tunneling of majority carriers across a very thin junction which, theoretically, occurs at the speed of light but is practically limited by junction capacitance and external circuit parameters; moreover, this quantum-mechanical tunneling phenomenon is not inhibited at cryogenic temperatures. A particular disadvantage of conventional tunnel diode arrangements employed in conjunction with cryogenic systems is the comparatively high level of power dissipation due to constant bias currents. In accordance with this invention, this disadvantage is avoided and power dissipation reduced to a minimum since the tunnel diode is only biased when a particular one of the binary quantities, i.e. binary "1," to be coupled, i.e. when the sense gate conductor is resistive. When the sense gate conductor is superconductive, the tunnel diode is unbiased and no power is dissipated.

The foregoing and other objects, features, and advantages of the invention will be apparent from the following more particular description of preferred embodiments of the invention, as illustrated in the accompanying drawings.

In the drawings:

FIG. 3 illustrates the current-voltage characteristics of a tunnel diode device.

FIG. 4 is a pulse diagram useful in describing the operation of the embodiments shown in FIGS. 1 and 2.

FIG. 5 is a further embodiment of the invention adapted to perform majority logic while effecting a coupling function.

Figure 1:
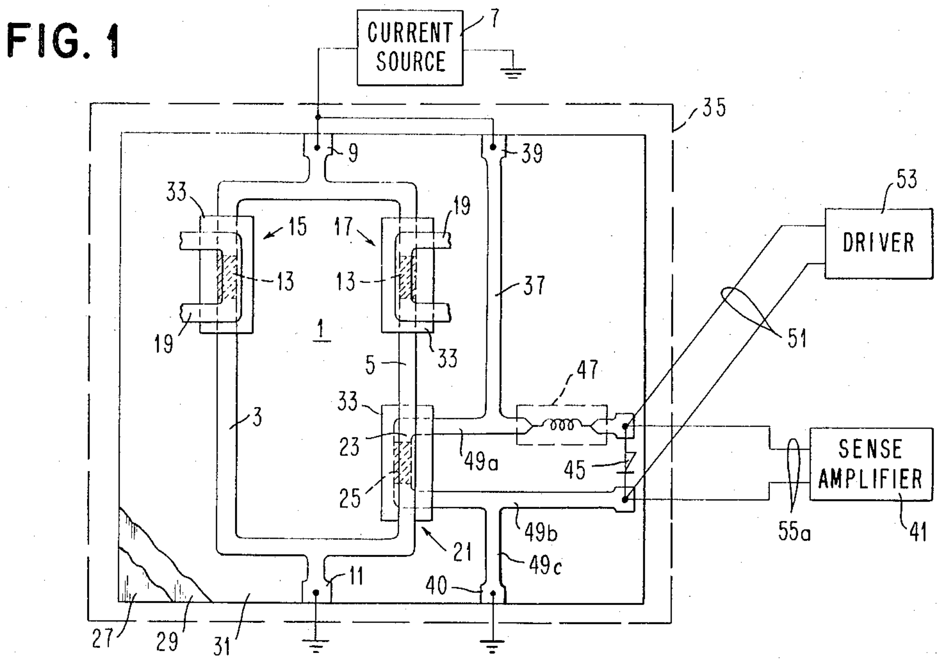
FIGS. 1 and 2 illustrate embodiments of this invention for effecting readout and intersubstrate coupling functions, respectively.
Figure 2:
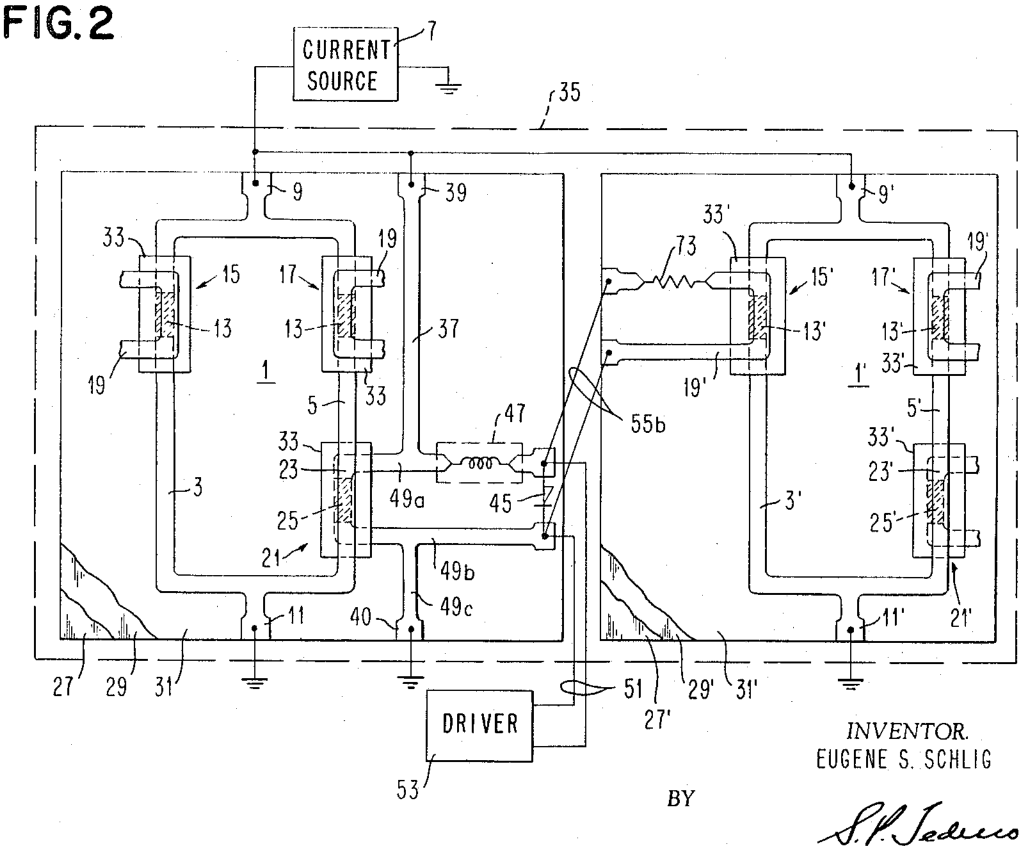

The cryogenic systems illustrated in FIGS. 1 and 2 wherein similar reference characters identify corresponding structures, each include a superconductive storage loop 1 from which information signals are to be coupled. Each storage loop 1 comprises alternate or parallel current paths defined by condutcors 3 and 5 formed of hard superconductor material, e.g. lead, and connected between a current source 7 and ground at land structures 9 and 11, respectively. Conductors 3 and 5 include integral segments of soft superconductive material, e.g. tin, defining gate conductors 13 of read-in cryotrons 15 and 17, respectively. In addition, each read-in cryotron includes a control conductor 19 formed of hard superconductive material and registered in magnetic field-applying relationship with the corresponding gate conductor 13. A sense cryotron 21 is associated with storage loop 1 and utilizes a section 23 of conductor 5 as a control conductor and with respect to which the corresponding gate conductor 25 is positioned in magnetic field-applying relationship. Sense cryotron 21 does not form an integral part of storage loop 1; rather, sense cryotron 21 is a low impedance source of information signals to be coupled, as hereinafter described, the state of sense gate conductor 25, either superconductive or resistive, being indicative of the memory state, either "0" or "1," of loop 1.

The cryogenic systems of FIGS. 1 and 2 can be formed by vacuum metalizing techniques onto, for example, a glass substrate 27 over which has been deposited a ground plane 29 of hard superconductive material and a thin layer 31 of dielectric material, e.g. silicon monoxide (SiO). Strip conductors 3 and 5 and also the various gate and control conductors along with the thin dielectric films 33 provided therebetween are deposited in turn through appropriate masking arrangements. Ground plane 29 serves as a magnetic shield to reduce inductance in storage loop 1 and also high-field edge effects of the various gate and control conductors. To maintain storage loop 1 entirely superconductive, the cryogenic system is artificially refrigerated below the critical transition temperature $T_c$ of the gate conductors 7 and also sense gate conductor 25 by means of a cryostat arrangement 35.

Current from source 7 normally divides between conductors 3 and 5 in a ratio inversely proportional to the respective resistances of the alternate current paths thus defined; while gate conductors 13 are superconductive, the resistance of each alternate current path is zero. Resistance, however, is introduced segmentally along a selected conductor 3 or 5 when gate conductor 13 integral therealong reverts to a normal resistance state. Superconductivity along a gate conductor 13 is destroyed when current $I_c$ is applied along the associated control conductor 19 to generate magnetic fields in excess of a critical magnitude $H_c$. When gate conductor 13 reverts to a resistive state, the resistance ratio of conductors 3 and 5 is infinite and, therefore, current from source 7 is forced to flow entirely along the other conductor. Current continues to flow along the other conductor subsequent to gate conductor 13 reverting to a superconductive state upon de-energization of the associated control conductor 19 due to the inductance of storage loop 1 and, also, since no energy is available to cause the current to divide between conductors 3 and 5. Therefore, the operation of storage loop 1 is bistable, a memory state being defined by current flow along a particular one of conductors 3 and 5. Storage loop 1 is switched between alternate memory states by energizing on a selective basis control conductors 19 of the read-in cryotrons 15 and 17, respectively.

The memory state of storage loops 1 of FIGS. 1 and 2, either "1" or "0," is manifested by the state, i.e. either resistive or superconductive, of sense gate conductor 25 since section 23 of conductor 5 is disposed as a control conductor in mangetic field-applying relationship therewith. Sense gate conductor 25 is connected between current source 7 and ground along conductors 37 and 49*c*, respectively, at land structures 39 and 40, respectively. When current flow in storage loop 1 is entirely along conductor 5, indicative of a binary "1," sense gate conductor 25 reverts to a normal resistance state whereby a voltage $V_s$ is developed thereacross. Alternatively, when current flow in storage loop 1 is entirely along conductor 3, indicative of a binary "0," sense gate conductor 25 continues superconductive and no voltage is developed thereacross.

In accordance with particular aspects of this invention, the binary information stored in storage loop 1 and manifested by the state of the associated sense gate conductor 25 is coupled to a sense amplifier 41 disposed exteriorly to cryostat arrangement 35 as shown in FIG. 1 or to a subsequent storage loop as shown in FIG. 2, wherein primed reference characters designate identical structures as hereinabove described.

The coupling arrangement comprises a tunnel diode device 45 formed on insulating layer 31 and connected in parallel arrangement with sense gate conductor 25 by strip conductors 49*a* and 49*b* of hard superconductive material. Series inductance 47 can be either stray inductance associated with conductors 49*a* and 49*b* or a physical inductance included therealong. The sense gate conductor 25-tunnel diode 45 arrangement is connected along a transmission line 51 to driver 53 disposed exterior to the cryostat arrangement 35. Also, the sense gate conductor 25-tunnel diode 45 arrangement is connected along a second transmission line to that unit to which information is to be coupled or transferred. For example, in FIG. 1, sense gate conductor 25-tunnel diode 45 arrangement is connected along transmission line 55*a* to sense amplifier 41; the same arrangement of FIG. 2 is coupled along transmission line 55*b* to control conductor 19' of read-in cryotron 17' of storage loop 1' deposited onto a substrate 27'. Transmission lines 55*a* and 55*b* illusrated in FIGS. 1 and 2, respectively, can be formed of thin films of superconductive material supported on a flexible strip, e.g. Mylar.

To effect a coupling function, low impedance driver 53 directs either a single or, alternatively, a series of positive drive pulses 57, as shown in FIG. 4*c*, along transmission line 51 and which are applied across the sense gate conductor 25-tunnel diode 45 arrangement. The duration of each drive pulse 57 is short compared to the inductive time constant of the sense gate conductor 25-inductance 47 arrangement so that drive currents flow almost entirely in tunnel diode 45. As the normal resistance of sense gate conductor 25 is in the order of milliohms, inductance 47 is of sufficient magnitude to prevent shorting of the tunnel diode 45 at this time.

As hereinabove mentioned, the memory state of storage loop 1 is manifested by the state of sense gate conductor 25 which provides appropriate bias to tunnel diode 45. When sense gate conductor 25 is resistive, i.e. binary "1," the resulting bias currents in tunnel diode 45 are supplemented by the drive currents and total in excess of the peak current $I_p$ whereby the tunnel diode switches to a high voltage state. Also, when sense gate conductor 25 is in a superconductive state, i.e. binary "0," tunnel diode 45 is unbiased and drive currents are only effective to shuttle the tunnel diode whereby only minimal noise is directed along the transmission line. For example, when sense gate conductor 25 is superconductive at time $t_0$, bias currents supplied from source 7 to tunnel diode 45 are shunted by the sense gate conductor and the tunnel diode is unbiased, i.e. in a zero current—zero voltage state indicated at point *a* of current—voltage characteristic curve 61 shown as FIG. 3. As no current flows through tunnel diode 45 at this time, no power is dissipated in the quiescent "0" state of storage loop 1 whereby no heat is introduced in cryostat arrangement 35. While sense gate conductor 25 is superconductive, drive pulse 57 causes the operation of tunnel diode 45 to traverse along the low voltage portion of characteristic curve 61 to point *b*. The amplitude of the drive pulse 57, being less than the peak current $I_p$, is singularly insufficient to switch tunnel diode 45 to the high voltage state; accordingly, the tunnel diode returns to a zero current—zero voltage state at point *a* at the termination of each drive pulse. The resulting voltage $V_1$ developed across the dynamic impedance of tunnel diode 45 produces a small noise signal 63, as illustrated in FIG. 4*d*, along the coupling transmission line 55*a* or 55*b*. As the forward impedance of tunnel diode 45 is much less than the characteristic impedance of drive transmission line 51, the transmission line is essentially unterminated and drive pulse 57 is reflected back, inverted, along the transmission line, as indicated by negative pulses 59 in FIG. 4*c*.

Subsequent to time $t_0$ and prior to time $t_1$, a binary "1" is stored in storage loop 1 when control conductor 19 of read-in cryotron 15 is energized. Concurrently, sense gate conductor 25 reverts to a resistive state; biasing currents $I_b$ in tunnel diode 45, however, rise exponentially with a time constant governed primarily by inductance 47 and the dynamic resistance of the tunnel diode in the low voltage state as illustrated by curve 65 in FIG. 4*b*. Accordingly, the operation of tunnel diode 45 traverses the low voltage portion of characteristic curve 61 to point *c*; load line 67 during the quiescent "1" state of storage loop 1 is essentially determined by inductance 47 and the normal resistance of the sense gate conductor 25 in series. While tunnel diode 45 is biased at point *c*, power dissipation, i.e. heat generated, is sufficiently low so as not to deleteriously affect the operation of storage loop 1. Biasing currents $I_b$ are greater than the diode valley current $I_v$ to provide monostable operation but less than the diode peak current $I_p$ to avoid free running operation.

A next subsequent drive pulse 57 applied along drive transmission line 51 at time $t_1$ supplements the bias current $I_b$ to switch tunnel diode 45 to a high voltage state. The amplitude of drive pulse 57 should be greater than the difference between peak current $I_p$ and bias current $I_b$ in tunnel diode 45 while sense gate conductor 25 is in a resistive state. Practically, the bias current $I_b$ should be a large enough fraction, say $1/6$ of peak current $I_p$, so as to allow reasonable drive pulse tolerance.

When the sum of bias currents $I_b$ and drive currents $I_d$ over the peak current $I_p$ is small, and neglecting loading effects, the operation of tunnel diode 45 switches to point *d* whereat it remains while drive pulse 57 is applied.

When drive pulse 57 is terminated, the operation of tunnel diode 45 immediately traverses the high voltage portion of characteristic curve 61 from point *d* to point *e* and from point *e* to the valley point *v* at a rate determined by inductance 47 and the dynamic resistance of tunnel diode 45. The output voltage developed across tunnel diode 45, however, is relatively constant and is indicated as $V_2$ in FIG. 4*c*. When current in tunnel diode 45 has reduced to less than the valley current $I_v$, the tunnel diode switches to the low voltage portion of characteristic curve 61 at point *f*. As indicated by load line 67, tunnel diode 45 is adapted for monostable operation and returns to the stable operating point *c* during the quiescent "1" state of storage loop 1. Accordingly, the low voltage binary "1" signal developed across sense gate conductor 25 is, in effect, amplified and converted to an information voltage pulse 69 of short duration as illustrated in FIG. 4*d*. Information pulse 69 thus generated is coupled along transmission line 55*a* to sense amplifier 41 to effect a readout function as shown in FIG. 1 or, alternatively, along transmission line 55*b* to the control conductor 19′ of a read-in cryotron 17′ to effect an intersubstrate coupling function as shown in FIG. 2.

With respect to the arrangement of FIG. 1, the conversion of the low level D.C. information signal developed across sense gate conductor 25 to an amplified information pulse 69 at the substrate end of transmission line 55*a* materially increases the signal-to-noise ratio of the readout system over that of conventional D.C. coupled readout arrangements wherein amplification of the information signal is initially effected exterior to the cryostat arrangement 35. Further, due to the very low signal-to-noise ratio of such conventional arrangements, discrimination of information or binary "1" signals required expensive and complex external hardware. The readout arrangement illustrated in FIG. 1 avoids these disadvantages by providing amplified information or binary "1" signals of short duration along the readout transmission line 55*a* whereby the signal-to-noise ratio is increased and the necessity of providing D.C. pass band is avoided.

Since information pulses 69 also appear concurrently along the drive transmission line 51, it is evident that a single transmission line arrangement can be employed to effect the readout function. It is noted that voltage pulses 69 are concurrently directed along drive transmission line 51 and coupling transmission lines 55*a* and 55*b* as indicated in FIG. 4*c*. Accordingly, driver 53 can be further adapted to include a sense amplifier and appropriate techniques employed to distinguish the information voltage pulses 69 and drive signals 57. Such arrangement would simplify assembly of the cryogenic system but may require additional external circuitry to effect the discriminating function.

With respect to the arrangement of FIG. 2, tunnel diode 45 is connected in parallel with control conductor 19′ of read-in cryotron 15′ along transmission line 55*b*. As control conductor 19′ is normally superconductive, resistor 73 is included in series therewith to avoid "shorting" the sense gate conductor 25-tunnel diode 45 arrangement. In addition, resistor 73 serves to load down tunnel diode 45 so as to realize a large current change when the tunnel diode is switched to the high voltage state by a drive pulse 57. In this event, the operation of tunnel diode 45 switches to the high voltage portion of characteristic curve 61 of FIG. 3 near the valley region, e.g. near point *v*. During the quiescent "0" state of storage loop 1, therefore, a drive pulse 57 applied along transmission line 51 and the resulting shuttling of tunnel diode 45 between points *a* and *b* of the characteristic curve 61 is ineffective to cause a current of critical magnitude along control conductor 19′. Accordingly, the storage state of loop 1′ is not switched and current from source 7 continues to flow along conductor 3′ indicating storage of a binary "0." While sense gate conductor 25 is in a resistive state, however, the resultant switching of tunnel diode 45 by a drive pulse 57 along drive transmission line 51 causes at least a critical magnitude of current $I_c$ to flow in control conductor 19′; accordingly, the associated gate conductor 13′ switches to a resistive state and current from source 7 is forced to flow entirely along conductor 5′ and binary "1" information has been transferred. When the coupling cycle terminates the control conductor 19′ and is de-energized, the associated gate conductor 13′ reverts to a superconductive state; however, current from source 7 continues to flow along current path 5′. Because of the relatively high output impedance of tunnel diode 45 and also the amplitude of the binary "1" signal 61, inductive effects of transmission line 55*b* and control conductor 19′ are materially reduced whereby intersubstrate coupling is effected at very fast speeds.

The coupling arrangement as hereinabove described can be adapted to perform majority-type logic as schematically illustrated in FIG. 5 wherein double-primed reference characters are employed to identify corresponding structures. In such event, tunnel diode 45″ is connected in parallel arrangement with an odd-numbered plurality of sense gate conductors 25″ arranged in tandem between current source 7″ and ground. The operation of the arrangement shown in FIG. 5 is substantially identical to that described with respect to FIG. 1. Sense control conductors 23″ each correspond to conductor 5 of a storage loop 1 shown in FIG. 1. When a plurality or all of the storage loops are in a binary "1" memory state and corresponding sense control conductors 23″ are energized, the associated sense gate conductors 25″ revert to a resistive state whereby bias currents in tunnel diode 45″ are at least equal to current $I_b$ but less than the peak current $I_p$ (see FIG. 3). Under such conditions, a drive pulse directed along drive transmission line 51″ is effective to switch tunnel diode 45″ through one cycle of operation whereby an information signal 57 (see FIG. 4*d*) is directed along coupling transmission line 55″. Alternatively, if less than a majority of sense gate conductors 25″ are in a resistive state, bias currents in tunnel diode 45″ are less than current $I_b$ and, therefore, not sufficient when supplemented by drive pulse 57 to switch tunnel diode 45″ through a cycle of operation. Under such conditions, only shuttle noise signals 63 appear along transmission line 55″ (see FIG. 4*d*). The arrangement of FIG. 5 can be extended by known techniques to perform majority type logic, e.g. OR and AND, by providing that one of the sense gate conductors 25″, as shown be normally maintained in a resistive state or in a superconductive state, respectively.

While the invention has been particularly shown and described with reference to preferred embodiments thereof, it will be understood by those skilled in the art that various changes in form and details may be made therein without departing from the spirit and scope of the invention.

What is claimed is:

1. A coupling arrangement for cryogenic systems wherein binary information to be coupled is manifested by the state of a superconductive element comprising
- a superconductive element adapted to be operated in a superconductive and a resistive state,
- binary information means for controlling the state of said superconductive element,
- current means connected to said superconductive element,
- a nonlinear device connected in parallel arrangement with said superconductive element, said nonlinear device having first and second distinct operating modes, biasing of said nonlinear device in said first mode by said current means being dependent on the state of said superconductive element,
- superconductive means for effecting said parallel arrangement,
- means for applying drive signals across said nonlinear device, said drive signals being of sufficient amplitude to cause said nonlinear device to switch to said second mode only when said superconductive element is in a resistive state, said drive signals being of short duration compared to the inductive time constant associated with said superconductive element, and
- means responsive to said nonlinear device while operating in said second mode.

2. A coupling arrangement as defined in claim 1 wherein said nonlinear device is a tunnel diode device.

3. A coupling arrangement as defined in claim 1 further including
- a cryotron device comprising a normally superconductive control conductor and a gate conductor in magnetic field-applying relationship therewith,
- impedance means connecting said control conductor in parallel arrangement with said nonlinear device, a switching of said nonlinear device to said second mode being effective to switch currents in excess of a critical magnitude along said control conductor to switch said gate conductor to a resistive state.

4. A coupling arrangement for cryogenic systems comprising
- a first cryogenic storage loop from which information is to be coupled,
- a sense cryotron associated with said storage loop and including a gate conductor operative in a superconductive and resistive state to indicate the binary memory state of said storage loop,
- a tunnel diode and inductive means tandemly connected in parallel arrangement with said gate conductor, said tunnel diode having a low impedance low voltage stable and a high voltage unstable state of operation,
- superconductive means for effecting said parallel arrangement,
- current means connected intermediate said inductive means and said gate conductor for supplying bias currents to said tunnel diode, the magnitude of bias currents supplied to said tunnel diode being determined by the state of said gate conductor,
- means for supplying drive signals of predetermined duration across said tunnel diode, said drive signals being of sufficient amplitude to switch said tunnel diode to said high voltage unstable state while said gate conductor is in a resistive state to generate information signals indicative of a particular binary memory state of said first storage loop, said inductive means being effective to isolate said gate conductor from said supplying means such that said drive signals are substantially totally applied across said tunnel diode, and
- coupling means connected to said tunnel diode.

5. A coupling arrangement as defined in claim 4 further including
- a second cryogenic storage loop to which information is to be coupled from said first storage loop,
- a read-in cryotron included in said second storage loop and having a normally superconductive control conductor,
- means for connecting said control conductor in parallel with said tunnel diode, said connecting means including resistance means to prevent shorting of said tunnel diode by said control conductor,
- a switching of said tunnel diode to said high voltage unstable state being effective to direct currents in excess of a critical magnitude along said control conductor to control the memory state of said second storage loop.

6. An information coupling arrangement for effecting majority-type logic in cryogenic systems comprising
- an odd-numbered plurality of superconductive elements arranged in tandem and each operative in a superconductive and a resistive state to indicate particular binary quantities,
- a nonlinear device connected in parallel arrangement with said tandem arrangement of superconductive elements and having a first and a second distinct operating modes, said nonlinear device being normally adapted to operate in said first mode, superconductive means for effecting said parallel arrangement, current means connected to said parallel arrangement for supplying bias currents to said nonlinear device, and means for applying drive signals across said nonlinear device, said drive signals being of sufficient amplitude to cause said nonlinear device to switch to said second operating mode when a plurality of said superconductive elements are operative in a resistive state said drive signals being of short duration compared to the inductive time constant associated with said tandem arrangement of superconductive element so as to be substantially totally applied across said nonlinear device.

7. An information coupling arrangement as defined in claim 6 wherein said nonlinear device is a tunnel diode.

References Cited by the Examiner

UNITED STATES PATENTS

| | | | |
|---|---|---|---|
| 3,048,825 | 8/1962 | Schmidlin et al. | 340—173.1 |
| 3,111,592 | 11/1963 | Watters | 307—88.5 |
| 3,149,312 | 9/1964 | Haynes | 340—173.1 |
| 3,167,748 | 1/1965 | Bremer et al. | 340—173.1 |

OTHER REFERENCES

March 1962, Pankove, J. I., Superconducting Logic Elements, RCA TN No. 542.

Pages 218–219, 1962, Gentile, S. P., Basic Theory and Application of Tunnel Diodes, D. Van Nostrand Co. Inc., Princeton, N.J.

BERNARD KONICK, *Primary Examiner.*

J. BREIMAYER, *Assistant Examiner.*